US006008753A

United States Patent [19]

Berg et al.

[11] Patent Number: 6,008,753

[45] Date of Patent: Dec. 28, 1999

[54] LOW RADAR CROSS-SECTION (RCS) MEASUREMENT CHAMBER AND ASSOCIATED MEASUREMENT SYSTEM

[75] Inventors: Donald J. Berg, Mesa, Ariz.; Carl A. Mentzer, Poway, Calif.; Paul T. Fisher, Scottsdale, Ariz.

[73] Assignee: McDonnell Douglas Corporation, St. Louis, Mo.

[21] Appl. No.: 09/020,337

[22] Filed: Feb. 9, 1998

[51] Int. Cl.[6] .............................. H01Q 17/00; G01S 7/40

[52] U.S. Cl. .............................................. 342/165; 342/4

[58] Field of Search .................................. 342/165, 1, 4

[56] References Cited

U.S. PATENT DOCUMENTS

| | | | |
|---|---|---|---|
| 3,100,870 | 8/1963 | Smith | 325/67 |
| 3,113,271 | 12/1963 | Buckley | 325/67 |
| 3,120,641 | 2/1964 | Buckley | 325/67 |
| 3,308,463 | 3/1967 | Emerson | 343/18 |
| 3,806,943 | 4/1974 | Hollaway | 343/703 |
| 4,507,660 | 3/1985 | Hemming | 342/1 |
| 4,713,667 | 12/1987 | Poirier et al. | 342/192 |
| 4,809,003 | 2/1989 | Dominek et al. | 342/165 |
| 4,879,560 | 11/1989 | McHenry | 342/165 |
| 4,901,080 | 2/1990 | McHenry | 342/1 |
| 4,931,798 | 6/1990 | Kogo | 342/165 |
| 4,947,175 | 8/1990 | Overholser | 342/165 |
| 4,990,923 | 2/1991 | Delfeld | 342/165 |
| 5,028,928 | 7/1991 | Vidmar et al. | 342/10 |
| 5,075,681 | 12/1991 | Kartiala | 342/165 |
| 5,099,244 | 3/1992 | Larson | 342/165 |
| 5,311,191 | 5/1994 | Scannapieco | 342/165 |
| 5,631,661 | 5/1997 | Sanchez | 343/703 |

*Primary Examiner*—Ian J. Lobo
*Attorney, Agent, or Firm*—Westerlund Powell, P.C.; Raymond H. J. Powell, Jr.; Robert A. Westerlund

[57] ABSTRACT

A measurement chamber which surrounds a target of interest intersected by a line defined by focal points associated with the measurement chamber and which separates and extracts scattered signals from the measurement chamber, includes a chamber having an interior defined by rotation of a nonlinear curve about the line, and first and second focusing elements which couple the scattered signals out of the measurement chamber. According to one aspect of the invention, the measurement chamber further includes first and second absorbing material sections which absorb the scattered signals, and which are disposed proximate to the distal ends of the first and second focusing elements, respectively. Alternatively, a measurement chamber which surrounds a target of interest disposed on the centerline of the measurement chamber and which separates and extracts scattered signals from the measurement chamber, includes a chamber having an interior defined by rotation of first and second non-linear curves about the centerline, and first and second focusing elements which couple the scattered signals out of the measurement chamber. Preferably, the first non-linear curve is a parabola having a focal point located on the centerline, while the second non-linear curve is a parabola having a focal point offset from the centerline by a predetermined offset distance. A corresponding measurement system is also described.

25 Claims, 5 Drawing Sheets

LOW RADAR CROSS-SECTION (RCS) MEASUREMENT CHAMBER AND ASSOCIATED MEASUREMENT SYSTEM

BACKGROUND OF THE INVENTION

The present invention relates generally to radar cross-section (RCS) measurement and antenna pattern ranges. More specifically, the present invention relates to low RCS measurement ranges employing a geometrically shaped measurement chamber to remove all but direct path reflections from the target of interest. Moreover, the present invention pertains to high performance anechoic chambers for antenna pattern measurement.

A radar system tracks a target in response to an echo, i.e., a reflected portion of the incident radar signal, from the target of interest. Therefore, it is critical to the design and operation of radar systems to be able to quantify, or otherwise describe this echo, particularly in terms of target characteristics, e.g., size, shape and/or orientation. One such characteristic is radar cross-section (RCS), which is the projected area of a metal sphere returning the same echo signal as the target of interest, assuming the metal sphere is substituted for the target of interest. Unlike the echo signal from a sphere, which is orientation independent, the echo signal, and thus the RCS, varies as a function of orientation of the target of interest. This variation can be very rapid, especially when the target of interest is many wavelengths in size.

RCS values of simple bodies can be computed exactly by solution of a wave equation defined in a coordinate system for which a constant coordinate coincides with the surface of the body. However, there is no known tactical target of interest which fits these solutions. The practical engineer cannot rely on predictions and calculations; the engineer must eventually measure the echo characteristics of the target of interest. This measurement can be performed on a full scale target of interest on an outdoor test range or on scale models to the target of interest in a measurement chamber. Current state of the art ranges include "compact ranges" which use a collimating reflector system to achieve the desired electromagnetic field distribution in the measurement zone (target area), i.e., to simulate a wide separation between the radar source and the target of interest.

Typical RCS chambers are rectangular rooms covered with Radar Absorber Materials (RAM). For a given target support system and antenna/radar system, the chamber performance is limited by the chamber size and shape and by absorber material employed. Cost limitations usually drive both the chamber size and the quantity and quality of the RAM installed in the chamber. The measurement capability in RCS chambers is limited by several factors, including:

(a) the chamber size and shape;

(b) the type and amount of RAM applied to the chamber walls;

(c) the target support system; and (d) the antenna radar system.

The room, i.e., measurement chamber itself, is often the limiting factor in RCS measurement chambers. Radar reflections or echo signals are generated by scattering from the target of interest. Echo signals which are not direct path may be either out of phase with the direct path echo signal or arrive at the radar at a later time than the direct path echo signal; thus, in either case, the non-direct path signals contaminate the RCS measurement. The conventional method of "quieting" the radar reflections from the room itself is by treating the chamber walls with large pyramidal RAM up to six feet deep that attenuates the incident microwave energy. In addition, radar range (time) "gating" (either true short pulse or synthetic short pulse) may be used to remove most radar reflected signals that arrive at the radar at a time other than the desired return from the target. However, since RAM provides only limited attenuation and since gating cannot provide echo signal cancellation to completely eliminate unknown short bounce interaction, and since range (time) gating cannot completely eliminate unwanted echo signals, the RCS measurement is usually contaminated by spurious echo signals. In other words, some diffuse returns from the absorber as well as some chamber wall returns will arrive at the radar at approximately the same time as the desired target return and cannot be gated out. These returns establish the background levels of the chamber. Since the target should be at least 10 decibels (dB) above the background level, this background level also establishes the limit on the lowest RCS target which can be measured using a given range.

Attempts have been made over the years to reduce the spurious scattered signals which contaminate RCS measurement. In particular, various proposals to improve or optimize the measurement chamber itself have been developed. For example, U.S. Pat. No. 4,507,660 disclosed an anechoic chamber which utilizes an expanded central area resembling two flared horns with their rims joined together and the vertexes of the anechoic chamber forming source and receiver portions. The purpose of this arrangement is to reduce the number of direct reflections to the target through a (structure) "dual-flared horn" geometry. A modification of this arrangement is disclosed in U.S. Pat. No. 5,631,661, which describes a modified dual flared horn having an internal diffraction edge absorber. An alternative structure is presented in U.S. Pat. No. 3,806,943, wherein a cylindrical chamber with conical end sections is disclosed. Other chamber configurations are disclosed in U.S. Pat. Nos. 3,308463, 3,100,870, 3,113,271 and 3,120,641.

Additionally, other chamber configurations are known. U.S. Pat. No. 4,931,798 discloses an elliptical anechoic chamber having RAM disposed at one to the two focal points of the ellipse. As shown in FIG. 1, the electromagnetic anechoic chamber includes an ellipsoidal metal shielding wall 10, which has an inner surface 12 defining a closed space 13. The inner surface 12 has first and second focus points 14 and 16 on a major axis 18 in the closed space 13. During operation, an electromagnetic wave is emitted from the first focus point 14 as an emitted wave, which is then reflected at the inner surface 12 of the shielding wall 10 towards the second focus point 16 as a scattered wave. Since the scattered wave is focused on the second focus point 16, the scattered wave can be absorbed by RAM disposed at the second focus point 16.

More specifically, as illustrated in FIG. 2, the electromagnetic anechoic chamber is configured for use in measurement of properties of one of receiving and transmitting antennas 22 and 24 which are placed in the closed space 13. The transmitting antenna 24 is located at the first focus point 14 and emits an electromagnetic wave as an emitted wave. The receiving antenna 22 is located between the first and the second focus points 14 and 16. The electromagnetic anechoic chamber further comprises absorption assembly 26 which is placed in the closed space 13. The absorption assembly 26 comprises an absorption member 28 and a supporting member 32 which supports the absorption member 28 at the second focus point 16. The absorption member 28 is made of material for absorbing the electromagnetic wave. In operation, the emitted wave travels in the closed space 13 and reaches be the shielding wall 10, where it is reflected by the inner surface 12 of the wall 10 into the closed space 13 as the scattered wave. Theoretically, the scattered wave is directed to the absorption member 28 disposed at the second focus point 16. As a result, the scattered wave is assumed to be effectively absorbed by the absorption member 28 and, thus, is never again reflected by the inner surface. Therefore, the '798 patent assumes that no resonance of the emitted wave can be caused and the scattered wave never reaches the receiving antenna 22.

It will also be appreciated that the emitted wave has a direct wave component which directly reaches the receiving antenna 22 without being reflected at the inner surface 12 of the shielding wall 10. In other words, the receiving antenna 22 receives only the direct wave. Therefore, it is theoretically possible to exactly measure the reception or transmission properties of one of the receiving and the transmitting antennas 22 and 24.

From the discussion above, it will be appreciated that the majority of the anechoic chambers mentioned above rely on absorbing materials, e.g., RAM, to prevent scattered waves generated either by scattering from the target of interest or emitted waves interacting with structures in the anechoic chamber from reaching the receiver. It will also be noted that RAM is a relatively large component of the overall cost of the anechoic chamber. Moreover, an anechoic chamber employing RAM has an associated maintenance cost, since RAM is subject to degradation over long periods of time. Moreover, frequent access to the measurement chamber by personnel for target change out and the like increases the degradation rate of the RAM. It will also be noted that an increase in the degree of absorbency provided by any particular RAM will generally be indicative of a non-linear cost increase for that RAM.

What is needed is a RCS measurement facility which emulates a free space measurement in that the only energy which arrives at the radar receiver is the direct backscatter from the target under test. It would also be highly beneficial if the RCS measurement facility or chamber were substantially devoid of RAM, thereby permitting fabrication of a more robust measurement chamber. In addition, what is needed is a measurement chamber which can be fabricated at a substantial cost savings, both in terms of construction and life cycle costs.

SUMMARY OF THE INVENTION

Based on the above and foregoing, it can be appreciated that there presently exists a need in the art for a measurement chamber suitable for accurate radar cross-section (RCS) determination which overcomes the above-described deficiencies. The present invention was motivated by a desire to overcome the drawbacks and shortcomings of the presently available technology, and thereby fulfill this need in the art.

One advantage of "Shaped Chamber" RCS measurement chamber is that the "ideal" RCS measurement system is approached through careful shaping of the chamber itself combined with the selective use of RAM and radar gating. Preferably, the shaped RCS measurement chamber is a body of revolution about an axis running through the center of the target measurement zone. The shape of the RCS chamber advantageously can be selected to meet the measurement requirements for the device, e.g., target or antenna, under test.

Moreover, the shaped RCS measurement chamber lends itself to the use of the collimating system illustrated in FIGS. 3–5. It will be appreciated that this collimating system must be an integral part of the chamber design and that its supporting structure must be non-intrusive.

An object according to the present invention is to provide a RCS measurement chamber which utilizes the geometric shaping and the physical optics features of an "ellipse" wherein the path of nearly all the scattered rays from the target at focus (2) will pass through the focus (1) while missing the source. The scattered rays or signals advantageously can be coupled out of the RCS measurement chamber, which eliminates the need for expensive, heavy absorbers on the walls of the RCS measurement chamber and complicated "gating" scenarios for scattered, but not absorbed, "rays."

Another object according to the present invention is to provide a RCS measurement chamber which, through geometrical shaping, removes all but the direct returns of the radar source back to itself. Preferably, the outer section of each ellipse is "smoothly blended" into an equivalent "hyperbola," which advantageously couples the scattered "rays" or "signals" out of the RCS measurement chamber at each end. It will be appreciated that this system requires a relatively precise "self-contained" (horn/reflector/lens) system that emanates a narrow "far-field" beam to the target.

According to one aspect of the present invention, multiple ellipses, e.g., dual-ellipse or triple-ellipse chambers with common foci, are desirable for implementing the RCS measurement chamber. In some geometries, the "dual-ellipse" RCS measurement chamber may permit the existence of one small region wherein scattered signals are directed back onto the target of interest. It will be appreciated that this would only occur for a large, flat planar region formed at the intersection between the ellipse and its adjacent hyperbola. If even this one known angle and specific distance, which permits construction of a very simple time gate or application of a small area of RAM, would keep the RCS measurement chamber from reaching the desired sensitivity, a "third" ellipse advantageously could be added to eliminate the small problematic region potentially present in the dual-ellipse configuration.

Still another object according to the present invention is to provide a RCS measurement chamber having low construction and maintenance costs. According to one aspect of the present invention, large chambers can be fabricated in two halves using a single mold, which mold advantageously can be many meters long. According to another aspect of the present invention, RCS measurement chamber maintenance costs can be minimized by limiting chamber access by operating and/or maintenance personnel. It will be appreciated that access can be minimized if the target support pylon or antenna mast can be installed through one end of the chamber. The RCS measurement chamber according to the present invention includes provisions for end access to the chamber.

These and other objects, features and advantages according to the present invention are provided by a measurement chamber which surrounds a target of interest intersected by a line defined by focal points associated with the measurement chamber and which separates and extracts scattered signals from the measurement chamber. Preferably, the measurement chamber includes a chamber having an interior defined by rotation of a nonlinear curve about the line, and first and second focusing sections which couple the scattered signals out of the measurement chamber. According to one aspect of the invention, the measurement chamber further includes first and second absorbing material sections which absorb the scattered signals, and which are disposed proximate to the distal ends of the first and second focusing sections, respectively.

In the measurement chamber recited above, rotation of said non-linear curve about the line preferably defines an elliptical chamber having a first focal point and a second focal point, although rotation of the non-linear curve about the line can also define first and second elliptical chambers having a common focal point. Most preferably, rotation of the non-linear curve about the line defines first, second and third elliptical chambers, wherein the first and second elliptical chambers have a first common focal point, and wherein the second and third elliptical chambers have a second common focal point.

These and other objects, features and advantages according to the present invention are provided by a measurement system having a measurement chamber which surrounds a target of interest intersected by a line defined by focal points associated with the measurement chamber and which separates and extracts scattered signals from the measurement chamber. The measurement system includes a chamber having an interior defined by rotation of a nonlinear curve about the line, first and second focusing sections which couple the scattered signals out of the measurement chamber, and a signal source which emits signals along the line, wherein the emitted signals interact with the chamber to thereby produce the scattered signals.

These and other objects, features and advantages according to the present invention are provided by a measurement chamber which surrounds a target of interest disposed on the centerline of the measurement chamber and which separates and extracts scattered signals from the measurement chamber, including a chamber having an interior defined by rotation of first and second non-linear curves about the centerline, and first and second focusing sections which couple the scattered signals out of the measurement chamber, wherein the first non-linear curve is a parabola having a focal point located on the centerline, and wherein the second non-linear curve is a parabola having a focal point offset from the centerline by a predetermined offset distance.

These and other objects, features and advantages of the invention are disclosed in or will be apparent from the following description of preferred embodiments.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

The preferred embodiments according to the present invention utilize geometric shaping and physical optics to form a geometrically shaped chamber, e.g., an "elliptical chamber," wherein the paths of substantially all the reflected rays, i.e., scattered rays, advantageously will pass through a focal point, i.e., focus (1), while simultaneously missing the source producing the emitted signal. It will be appreciated that this eliminates the need for expensive, heavy absorbers on the walls of the measurement chamber.

The "shaped chamber" according to the preferred embodiments of the present invention utilizes geometrical shaping to achieve background levels better than those available from conventional chambers. The geometric shaping is performed through the use of physical optics (ray tracing) techniques. The objective of the shaping analysis in the design of the RCS measurement chamber is to define chamber shapes which minimize the need for RAM on the chamber walls. The ideal RCS measurement system will allow "plane wave" far field energy into the antenna/radar system to measure the far field RCS or antenna pattern while, at the same time, excluding substantially all of the energy scattered by the target or antenna in other directions. Thus, a major benefit of the shaped chamber is that an "ideal" RCS measurement system advantageously can be approached through careful shaping of the chamber itself, combined with the selective use of RAM and radar gating.

Preferably, the shaped RCS measurement chamber is a body of revolution about an axis running through the center of the target measurement zone. The shape of the RCS measurement chamber advantageously can be selected to meet the measurement needs. Moreover, it will be appreciated that the exemplary geometries, which are discussed in greater detail below, minimize the requirement for complicated "gating" scenarios and equipment to filter out scattered, but not absorbed, "rays."

Figure 1:
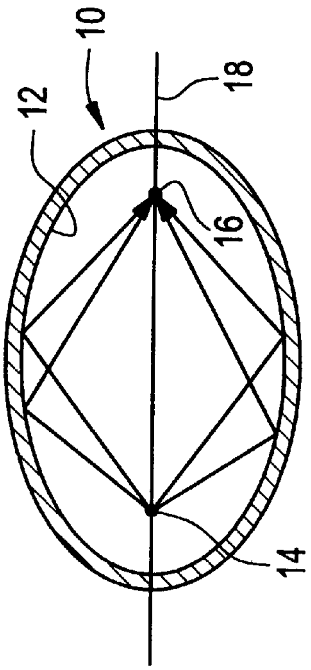
FIG. 1 PRIOR ART
FIG. 1 is a view of a shielding wall of a conventional ellipsoidal shape for illustrating the function of the wall.
Figure 2:
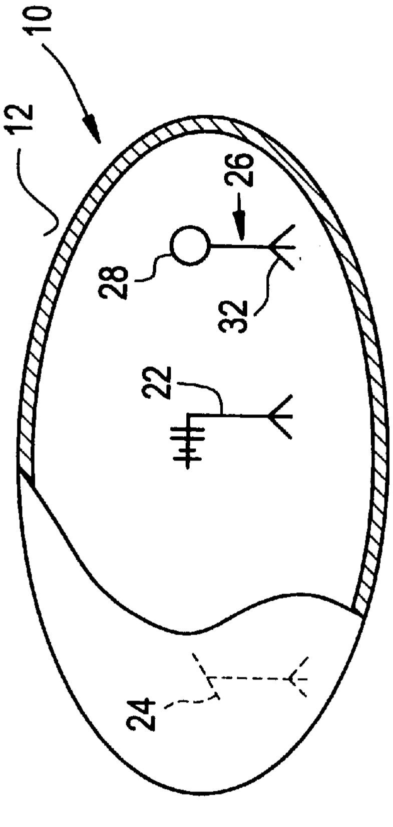
FIG. 2 PRIOR ART
FIG. 2 is a partially broken away elevated view of the conventional electromagnetic anechoic chamber illustrated in FIG. 1.
Figure 3:
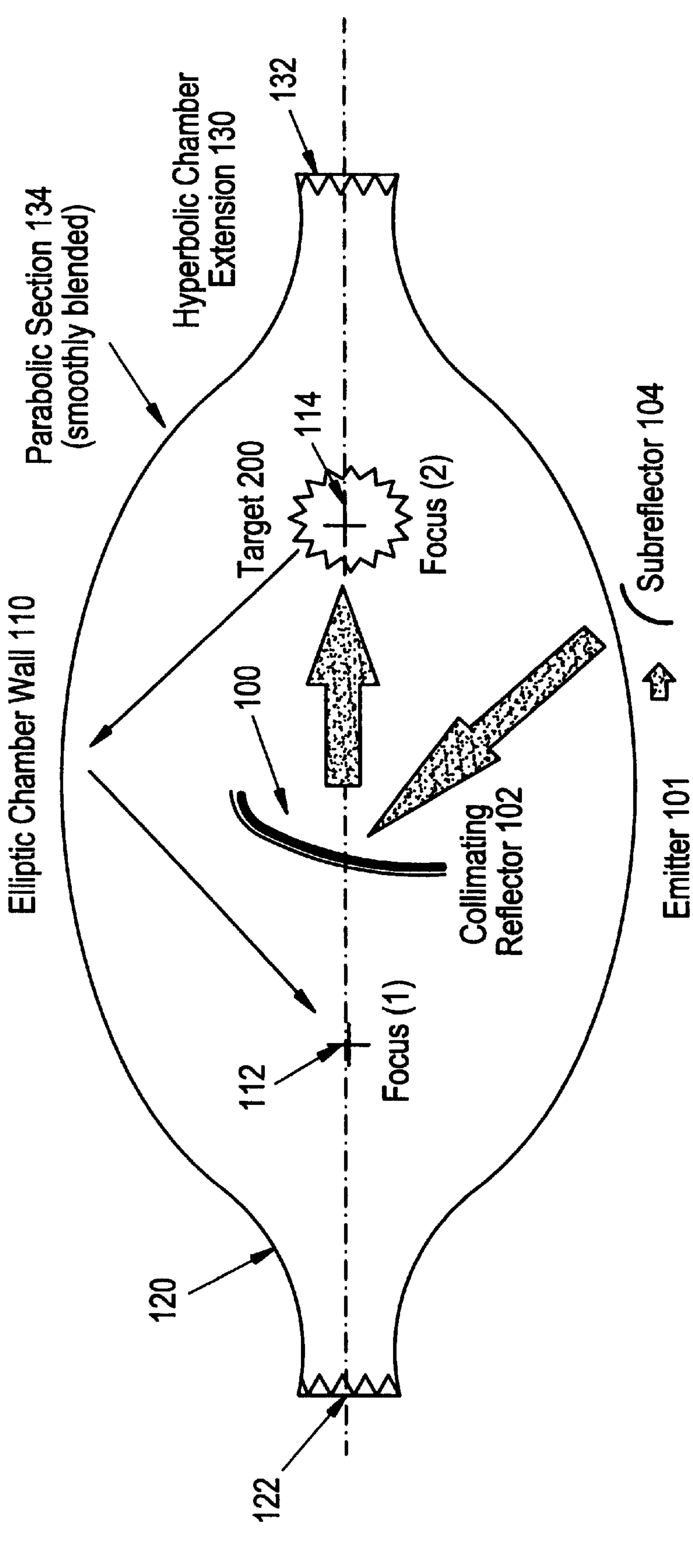
FIG. 3 illustrates a first preferred embodiment of a low radar cross-section (RCS) measurement chamber according to the present invention.
Figure 4:
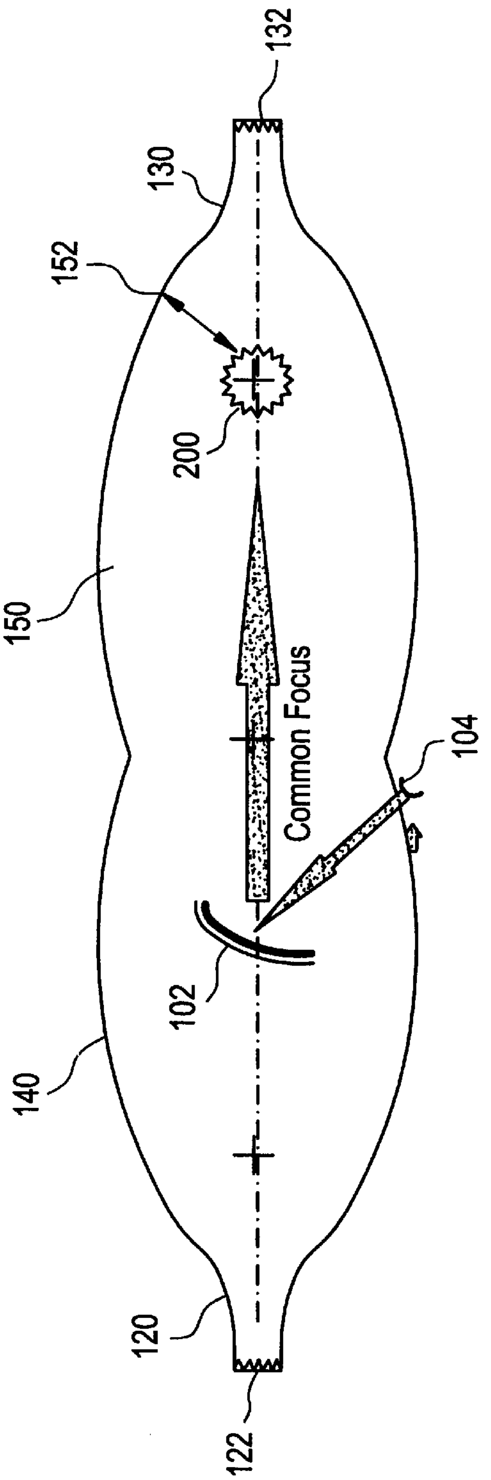
FIG. 4 illustrates a second preferred embodiment of a low radar cross-section (RCS) measurement chamber according to the present invention.
Figure 5:
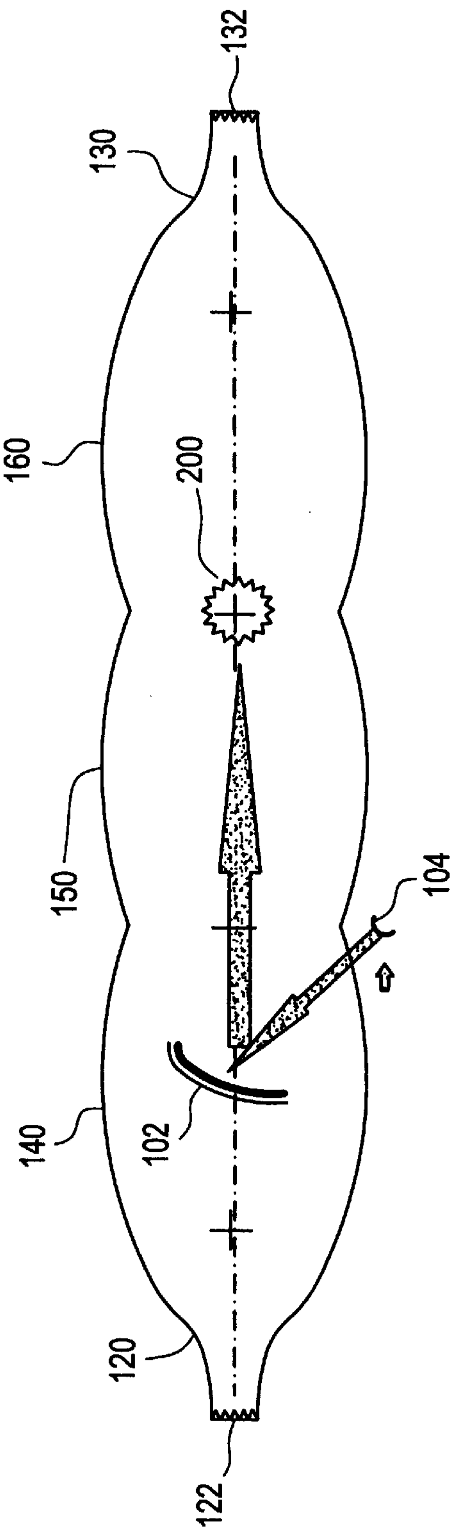
FIG. 5 illustrates a third preferred embodiment of a low radar cross-section (RCS) measurement chamber according to the present invention.

The shaped chamber lends itself to the use of a collimating system, i.e., source 100, as shown in FIGS. 3–5, which are discussed in greater detail immediately below. The collimating system for the shaped RCS measurement chamber advantageously would be similar to current state of the art parabolic reflectors, except that the main parabolic reflector 102 advantageously would have a highly offset design, which puts the focus of the parabola at the chamber wall or just outside the chamber. It should be mentioned that this is necessary to minimize the structure inside the chamber to thereby keep internal reflections to an absolute minimum. Any of the conventional reflectors in use today, e.g., primary focus reflectors, Schmidt reflectors, Cassegrain reflectors, or Gregorian feed reflectors advantageously may be adapted to the specific design criteria employed by the RCS measurement system. Preferably, one or more shaped subreflectors 104 can be employed concurrently to control the illumination uniformity across the main parabolic reflector surface. It should be mentioned that the collimating system should be an integral part of the RCS measurement chamber design requirement, so that its supporting structure can be made as non-intrusive as possible. One possible, minimally intrusive support system is disclosed in commonly assigned U.S. Pat. No. 5,936,568, which application is incorporated herein by reference for all purposes.

Before discussing any of the preferred embodiments according to the present invention, it will be helpful to establish the terminology used throughout this section. A source 100, which in an exemplary case can be a collimating source or the like, generates emitted signals, which are directed toward the target of interest 200. A portion of the emitted signals scattered by the target of interest 200 will be returned in the direction of the source 100; these signals will hereinafter be referred to as backscattered signals. Another portion of the emitted signals will impinge on the target of interest 200 and be scattered in various directions. These latter signals will impinge on the RCS measurement chamber walls and be directed toward one of the foci of the low RCS measurement chamber; henceforth these signals will be referred to as scattered signals. It will be appreciated that a portion of the emitted signals will miss the target of interest 200 completely. Since those signals will also interact with the walls of the RCS measurement chamber, those signals will be referred to as scattered signals.

A first preferred embodiment of the measurement chamber according to the present invention will now be discussed with respect to FIG. 3, wherein an elliptical chamber 110 having first and second focal points 112 and 114 is illustrated. Advantageously, the chamber 110 is joined to first and second focusing sections or portions (hereinafter elements) 120 and 130 such that the interior surface of the elliptical chamber 110 intersects and makes smooth transitions with focusing sections 120 and 130. As discussed in greater detail below, focusing elements 120 and 130 focus, force or couple the scattered signals out of the RCS measurement chamber. Advantageously, sections 120 and 130 can focus the scattered signal onto RAM 122 and RAM 132, respectively. It should be mentioned that the volume of the RCS measurement chamber illustrated in FIG. 3 is the swept volume of the elliptical chamber 110 and the focusing sections 120 and 130. It should also be mentioned that the axis of rotation includes focal points 112 and 114.

Preferably, the focusing sections 120 and 130 can be of any shape, although non-linear geometries are particularly beneficial. For example, the focusing elements 120 and 130 advantageously can be hyperbolas, although parabolas can also be employed.

The Single Ellipse/Parabola/Hyperbola RCS measurement chamber of FIG. 3 advantageously provides a compact shaped chamber with the target of interest 200 disposed at focus (2) of the ellipse 110. With perfectly conducting chamber walls, all of the scattered and backscattered signal energy emanating from the region of target of interest 200 will pass through a similar zone near focus (1). It will be appreciated that, in reality, the presence of the collimating feed of source 100 and its attendant support(s) will result in some scattering within the RCS measurement chamber, which will be detected as secondary scattered signals by the radar system. These secondary scattered signals can be reduced by proper shaping of the collimator support structure; these secondary scattered signals can be further reduced by the employment of RAM 122, 132 in the RCS measurement chamber and gating in the radar system receiver.

As mentioned above, at the left end of the RCS measurement chamber, i.e., at focusing section 120, the wall shape has a smooth blending from the ellipse to a hyperbola to capture the energy which would otherwise hit the extremes of the elliptical chamber and be reflected back into the chamber. At the right end of the elliptical chamber 110, i.e., at focusing section 130, the wall shape can be more complex. A parabolic section 134 advantageously can be included in focusing element 130 to direct scattered signals striking that region into the space around the collimating reflector of source 100 instead of into the reflector itself. It will be appreciated that the hyperbolic chamber extension on the right, i.e., focusing section 130, funnels the directly radiated energy from the feed into a small region of RAM 132 rather than reflecting from the elliptical back wall. Because the scattered signals will undergo multiple reflections while entering and exiting the hyperbolic sections of the RCS measurement chamber, modest amounts of moderate performance RAM advantageously can be employed to effectively eliminate scattered signals, thus preventing scattered signals from being directed back into the shaped RCS measurement chamber itself.

A second preferred embodiment of the measurement chamber according to the present invention is illustrated in FIG. 4, wherein first and second elliptical chambers 140 and 150 are substituted for elliptical chamber 110. A third preferred embodiment of the measurement chamber according to the present invention is illustrated in FIG. 5, wherein first, second, and third elliptical chambers 140, 150, and 160 are substituted for elliptical chamber 110. It will be appreciated from the discussion which follows that increasing the number of elliptical chambers linearly connected to one another decreases the number of scattered signals detected by the receiver associated with the measurement chamber.

The fundamental advantage of geometrical shaping is that all but the direct path backscattered signals of the radar source back to itself can be removed from the RCS measurement chamber. As previously mentioned, configuring the RCS measurement chamber with a relatively precise "self-contained" radar system that emanates a narrow "far-field" beam at the target 200 advantageously facilitates design of such a chamber. Multiple ellipses, with common foci, are particularly advantageous for the shaped RCS measurement chamber. Preferably, each of the two outer ends of the single elliptical chamber or the serially connected elliptical chambers should be "smoothly blended" into an equivalent "hyperbola" to focus or force or couple the scattered signals out of the RCS measurement chamber through the focusing sections 120 and 130.

It should be noted that the second preferred embodiment of the RCS measurement chamber according to the present invention, i.e., the double-ellipse configuration illustrated in FIG. 4, has a small region 152, marked by a ray coming back on itself, wherein the scattered signal is not focused out of the measurement chamber. It should be mentioned that the problem would only occur in the vicinity of a large, flat 1 planar region at the angle of intersection between, for example, the elliptical chamber 150 and the hyperbolic focusing section 130. It should be noted that when this one known angle and specific distance, which would permit the introduction of one very simple time gate in the measurement circuitry or which would permit the introduction of RAM at this critical area of the measurement chamber, would prevent the measurement chamber from reaching the required sensitivity level, a "third" elliptical chamber advantageously could be added so that no target-to-wall-to-target-to source signal path can be established. From inspection of FIG. 5, it will be appreciated that the addition of elliptical chamber 160, such that the target of interest 200 occupies a focal point common to elliptical chamber 150 and 160, eliminates the above-mentioned problem.

Thus, the "dual-ellipse" RCS measurement chamber of FIG. 4 uses two elliptical chambers 140 and 150 which share a common focus at the center of the chamber. By placing the collimating feed/radar system 100 between of the foci of the ellipse 140 and by placing the target 200 at the focus of the ellipse 150, the arrangement ensures that only the backscattered direct signals from the target 200 reach the feed and that none of the scattered signals scattered by the target 200 in other directions arrive at the feed, i.e., source 100. This is assured by the fact that any scattered signal emanating from one focus of the ellipse 150 will pass through the other focus of ellipse 150 after reflection from the elliptical wall. In this manner, the need for high quality range gating for the radar system and the provision of RAM on the walls of the RCS measurement chamber can be minimized.

As discussed briefly above, also identified in FIG. 4 is the existence of a reflection ring 152, which occurs near the target zone. Within this ring, specular reflections can occur which could be reflected back into the feed assembly 100. For this to occur, the target 200 must reflect energy into the reflection ring and, after reflection from the chamber wall, the target 200 must once again reflect the energy back to the collimating feed from source 100. If this return cannot be range (time) gated by the radar system, RAM advantageously can be placed in this zone to minimize these reflections.

An alternative solution for this potential reflection ring problem is to incorporate a third elliptical chamber section 160 into the RCS measurement chamber design, as shown in FIG. 5. By adding this additional chamber cell, the energy associated with signals which could detrimentally be reflected off the wall, and back into the feed, now propagates into the third chamber, and eventually ends up being absorbed by the hyperbolic termination section, i.e., focusing element 130.

It should be mentioned that this "triple-ellipse" arrangement is the optimum solution, i.e., produces the cleanest backscattered signal with the lowest percentage of scattered signal noise. The "triple-ellipse" configuration according to this preferred embodiment of the present invention advantageously allows interior measurements in a relatively small room, thus minimizing the cost associated with the measurement chamber.

It should be mentioned that all of the preferred embodiments according to the present invention require a very low RCS support mechanism for the target of interest 200 that does not have direct target/wall/source reflections. It will also be appreciated that the same support mechanism advantageously can be used to support the source 100. Such a support mechanism is disclosed in a commonly assigned, U.S. Pat. No. 5,936,568, which is incorporated herein by reference for all purposes.

Figure 6:
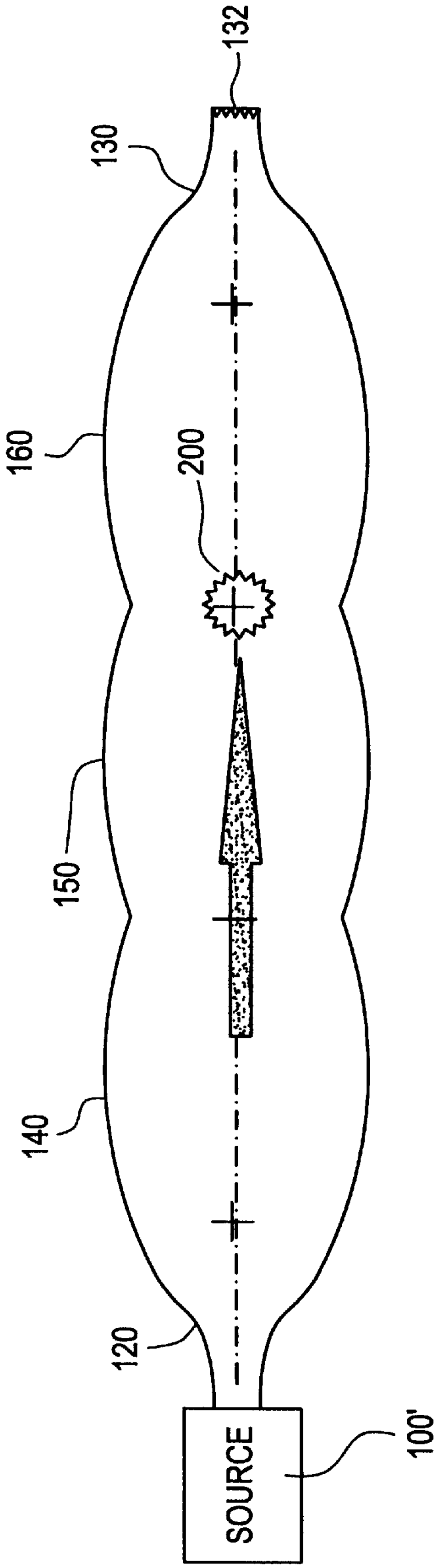
FIG. 6 illustrates an alternative preferred embodiment of a low radar cross-section (RCS) measurement chamber illustrated in FIG. 5.

It should also be mentioned that the geometric chamber arrangements illustrated in FIGS. 3–5 could, with slight modifications, advantageously could be adapted to other uses. For example, the measurement chamber could be used as a "low-frequency" range provided that the self-contained source including a horn, reflector and lens was removed and a lens and source mechanism were placed deep in the hyperbola section, i.e., focusing section 120, as illustrated in FIG. 6. Alternatively, high frequency testing, e.g., in the millimeter (mm) waveband range, could also be performed utilizing a special source 300, which is substituted for existing source 100.

Moreover, this geometric chamber arrangement illustrated in FIGS. 3–5 advantageously could be used for "water-vehicle" testing, provided that the two "focusing sections" 20 and 30 were dammed up and provided that the measurement chamber were half-filled with water. It will be appreciated that the measurement chamber, when intended for use as a water-vehicle test chamber, must be sized to accommodate standard Navy scale models. Beneficially, a wave generating machine could even be added. Thus, on-water vehicle testing is practical. It should be mentioned that with proper chamber design, the lower half of the chamber could be filled with water so that the antenna patterns or RCS of ships and submarine periscopes advantageously can be evaluated. Since one of the principle advantages of the measurement chamber according to the present invention is geometric shaping which eliminates wall returns, thereby minimizing or eliminating the use of absorber or gating techniques, it will be appreciated that the present invention operates irrespective of the type of fluid occupying the measurement chamber.

Figure 7:
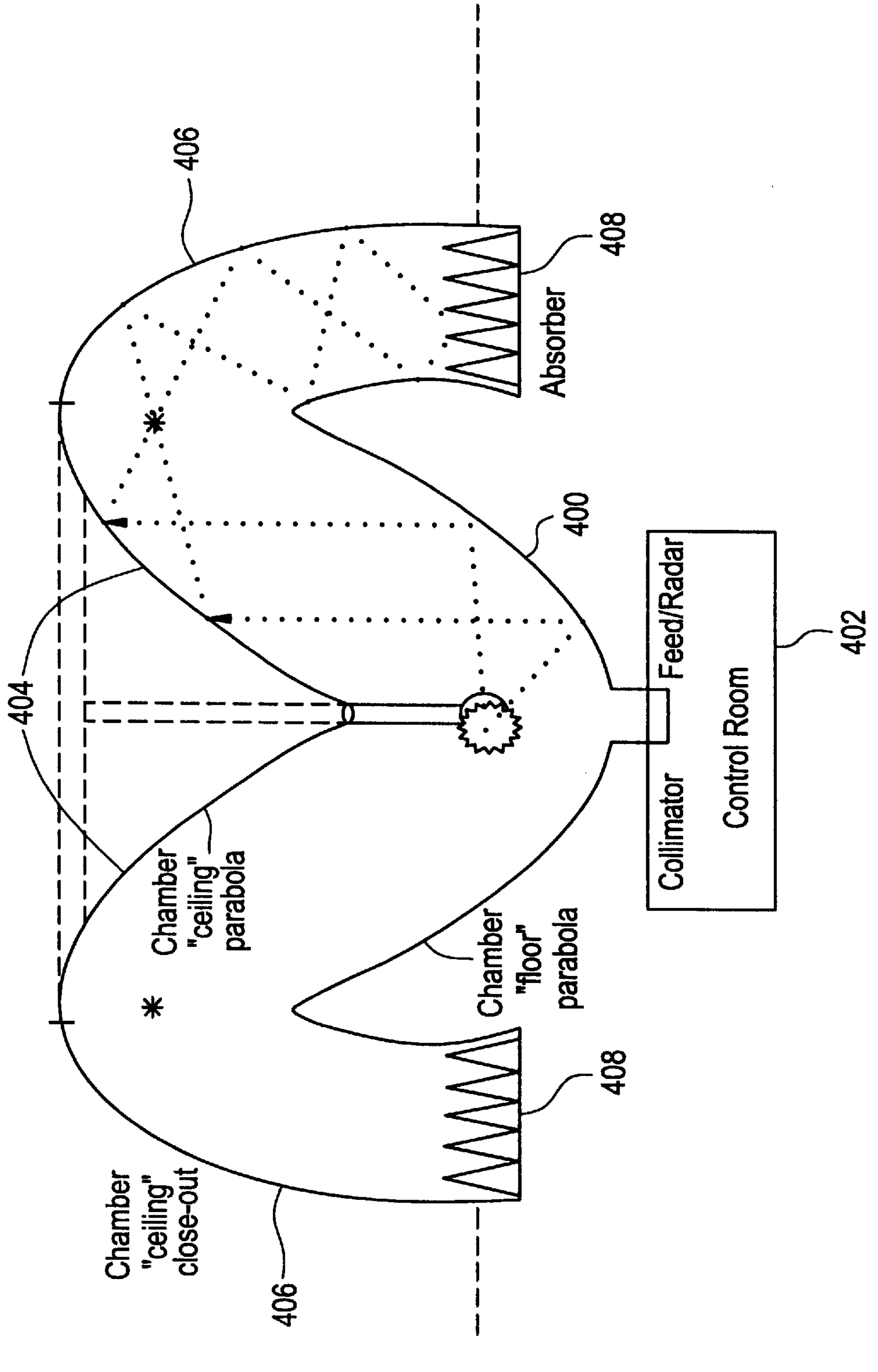
FIG. 7 illustrates a fourth preferred embodiment of a low radar cross-section (RCS) measurement chamber according to the present invention.

Another preferred embodiment of the RCS measurement chamber according to the present invention is illustrated in FIG. 7, which shows a measurement chamber formed from multiple parabolic surfaces rotated about a vertical axis of symmetry. Preferably, the vertically suspended pylon and target 200 run through the axis of rotation. The measurement chamber "floor" advantageously can be a parabola of revolution 400 which has the target at its focus. In the exemplary configuration illustrated in FIG. 7, a non-intrusive collimator feed/radar system is disposed in the control room 402, which is located below the floor at the center of the measurement chamber. The measurement chamber ceiling can best be described as a parabolic "funnel" 404 formed by rotating a parabolic shape about an axis through the chamber centerline. When considered in three dimensions, the RCS measurement chamber ceiling parabola 404 has a "focus ring" in the horizontal plane. This surface advantageously may be either a full parabola or a partial parabola, as illustrated (for size reduction). It should be noted that the measurement chamber ceiling close-outs 406 can be shaped to reflect energy toward a small amount of absorber 408 located in each the close-out 406. The clear advantage of the RCS measurement chamber system illustrated in FIG. 7 is that all reflections off the chamber walls are directed through the "focus-ring" or directly on first bounce past the "lip" of the bottom parabola into the necked down part of the chamber close-out 406 and, thus, into the absorber 408.

It will be appreciated that the RCS measurement chambers illustrated in any of FIGS. 3–7 can be fabricated as shown or rotated 90°; either orientation works equally well. These variations provide interesting possibilities for target handling and other measurement needs. It will be appreciated that vertical orientation could be expected to result in lower maintenance costs, as gravity would assist in keeping the critical areas of the RCS measurement chamber clean.

It should be mentioned that the shaped RCS measurement chamber could also be used as an antenna pattern measurement facility since the chamber shaping techniques used to minimize reflections from the chamber walls and collimating system advantageously will also optimize the fields incident on an antenna under evaluation The shaped RCS measurement chamber could be used as a low frequency range by replacing the collimating system, i.e., feed and reflector, with a low frequency feed and lens placed deep in the hyperbola section, as depicted in FIG. 6, behind, for example, the source illustrated in FIG. 3.

The RCS measurement chamber according to the present invention, in addition to minimizing scattered signals interacting with the receiver, advantageously permits construction of the measurement chamber at a relatively low cost. One exemplary method of construction would simply be to scoop out a hole in the earth while using forms, i.e., a series of templates, to control the final shape of the hole. A mold would then be formed in a manner similar to forming a so-called gunnite swimming pool, i.e., install a wire mesh around the sides and along the bottom of the hole and then spray concrete over the mesh. This gunnite form would then be sealed and smoothed. The resultant gunnite structure becomes the "tool" and bottom support which is employed in fabricating "swimming-pool" shells that become the top and bottom halves of the measurement chamber. It will be appreciated that craftsman such as boat-builders could lay up composite or fiberglass shells, with the first shell being formed and removed while the second shell would be formed and then left in place. It will be appreciated that the first shell would then be turned over to form the "roof" of the measurement chamber. Smaller measurement chambers could either be fabricated from separate sections or formed by other well known fabrication processes such as rotational molding.

It should be mentioned that when a small amount of path variation is noticed due to all parts of the target not being exactly coincident with one of the focus points, the measurement chamber advantageously could be sprayed with a thin layer of magnetic radar absorber material (MAGRAM) to alleviate this problem.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A measurement chamber which surrounds a target of interest intersected by a line defined by focal points associated with the measurement chamber and which separates and extracts scattered signals from the measurement chamber, said measurement chamber comprising:

a chamber having an interior defined by rotation of a nonlinear curve about the line; and first and second focusing sections which couple the scattered signals out of said chamber.

2. The measurement chamber as recited in claim 1, further comprising first and second absorbing material sections which absorb the scattered signals, and which are disposed proximate to the distal ends of said first and second focusing sections, respectively.

3. The measurement chamber as recited in claim 1, wherein said first and second focusing sections are defined by a hyperbola rotated about the line.

4. The measurement chamber as recited in claim 3, where the transition between said non-linear curve and said hyperbola is a parabolic section.

5. The measurement chamber as recited in claim 3, wherein the transition between said non-linear curve and said hyperbola is blended.

6. The measurement chamber as recited in claim 1, wherein rotation of said non-linear curve about the line defines an elliptical chamber having a first focal point and a second focal point.

7. The measurement chamber as recited in claim 6, wherein the target of interest is located at said first focal point and wherein a predetermined portion of the scattered signals intersect said second focal point.

8. The measurement chamber as recited in claim 1, wherein rotation of said non-linear curve about the line defines first and second elliptical chambers having a common focal point.

9. The measurement chamber as recited in claim 8, wherein the target of interest is not located at said common focal point and wherein a predetermined portion of the scattered signals intersect said common focal point.

10. The measurement chamber as recited in claim 1, wherein rotation of said non-linear curve about the line defines first, second and third elliptical chambers, wherein said first and second elliptical chambers have a first common focal point, and wherein said second and third elliptical chambers have a second common focal point.

11. The measurement chamber as recited in claim 10, wherein said target is located at one of said first and second common focal points.

12. A measurement system having a measurement chamber which surrounds a target of interest intersected by a line defined by focal points associated with the measurement chamber and which separates and extracts scattered signals from the measurement chamber, said measurement system comprising:

a chamber having an interior defined by rotation of a non-linear curve about the line;

first and second focusing sections which couple the scattered signals out of said chamber; and a signal source which emits signals along the line, wherein the emitted signals interact with the chamber to thereby produce the scattered signals.

13. The measurement system as recited in claim 12, further comprising first and second absorbing material sections which absorb the scattered signals, and which are disposed proximate to the distal ends of said first and second focusing sections, respectively.

14. The measurement system as recited in claim 12, wherein said first and second focusing sections are defined by a hyperbola rotated about the line.

15. The measurement chamber as recited in claim 14, wherein said signal source is disposed within one of said first and second focusing sections.

16. The measurement system as recited in claim 12, wherein rotation of said non-linear curve about the line defines an elliptical chamber having a first focal point and a second focal point.

17. The measurement system as recited in claim 16, wherein the target of interest is located at said first focal point, wherein a predetermined portion of the scattered signals intersect said second focal point, and wherein said signal source is located between said first and second focal points.

18. The measurement system as recited in claim 12, wherein rotation of said non-linear curve about the line defines first and second elliptical chambers having a common focal point.

19. The measurement system as recited in claim 18, wherein:

the target of interest is located on a focal point, the target of interest is not located at said common focal point a predetermined portion of the scattered signals intersect said common focal point, said signal source is not located on any focal point, and said signal source and the target of interest are on opposing sides of said common focal point.

20. The measurement system as recited in claim 12, wherein said signal source comprises a parabolic reflector having a focal point a selected one of on said chamber and outside of said chamber.

21. The measurement system as recited in claim 12, wherein said signal source comprises a wave machine.

22. The measurement system as recited in claim 12, wherein rotation of said non-linear curve about the line defines first, second and third elliptical chambers, wherein said first and second elliptical chambers have a first common focal point, and wherein said second and third elliptical chambers have a second common focal point.

23. The measurement chamber as recited in claim 22, wherein said target is located at said first common focal point and wherein said signal source is separated from said target by said second common focal point.

24. A measurement chamber which surrounds a target of interest disposed on the centerline of the measurement chamber and which separates and extracts scattered signals from the measurement chamber, the measurement chamber comprising:

a chamber having an interior defined by rotation of first and second non-linear curves about the centerline; and first and second focusing sections which couple the scattered signals out of the measurement chamber, wherein said first non-linear curve is a parabola having a focal point located on the centerline, and wherein said second non-linear curve is a parabola having a focal point offset from said centerline by a predetermined offset distance.

25. The measurement chamber as recited in claim 24, further comprising first and second absorbing material sections which absorb the scattered signals, and which are disposed proximate to the distal ends of said first and second focusing sections, respectively.

* * * * *